United States Patent
Luczak et al.

(10) Patent No.: US 9,669,674 B2
(45) Date of Patent: Jun. 6, 2017

(54) SUSPENSION STRUT FOR A MOTOR VEHICLE WITH A HEIGHT-ADJUSTMENT DEVICE

(71) Applicant: THYSSENKRUPP BILSTEIN GMBH, Ennepetal (DE)

(72) Inventors: Hanno Luczak, Hattingen (DE); Stefan Mages, Hürth (DE); Markus Wölk, Hattingen (DE)

(73) Assignee: THYSSENKRUPP BILSTEIN GMBH, Ennepetal (DE)

( * ) Notice: Subject to any disclaimer, the term of this patent is extended or adjusted under 35 U.S.C. 154(b) by 0 days.

(21) Appl. No.: 14/653,125

(22) PCT Filed: Nov. 20, 2013

(86) PCT No.: PCT/EP2013/074229
§ 371 (c)(1),
(2) Date: Aug. 12, 2015

(87) PCT Pub. No.: WO2014/095211
PCT Pub. Date: Jun. 26, 2014

(65) Prior Publication Data
US 2016/0200162 A1 Jul. 14, 2016

(30) Foreign Application Priority Data
Dec. 20, 2012 (DE) .................. 10 2012 112 717

(51) Int. Cl.
*B60G 15/06* (2006.01)
*B60G 17/027* (2006.01)

(52) U.S. Cl.
CPC ....... *B60G 15/065* (2013.01); *B60G 17/0272* (2013.01); *B60G 2202/312* (2013.01);
(Continued)

(58) Field of Classification Search
CPC .............. B60G 17/0272; B60G 15/065; B60G 2206/426; B60G 2202/32
See application file for complete search history.

(56) References Cited

U.S. PATENT DOCUMENTS 2,892,636 A 6/1959 Brooks
3,537,696 A * 11/1970 Webster, Jr. ........... B60G 17/02
267/293

(Continued)

FOREIGN PATENT DOCUMENTS

CN 1443665 A 9/2003
DE 3223195 12/1983
(Continued)

OTHER PUBLICATIONS

PCT International Search Report mailed Feb. 7, 2014 for PCT International Application No. PCT/EP2013/074229 with English Translation, 7 pages.
(Continued)

*Primary Examiner* — Drew Brown
(74) *Attorney, Agent, or Firm* — Remarck Law Group PLC

(57) ABSTRACT

The present invention relates to a suspension strut for a motor vehicle with a vibration damper, with a supporting spring and with a height-adjustment device, with which the height of the vehicle body of the motor vehicle can be changed, and wherein the suspension strut has an auxiliary spring having a lower spring characteristic than the supporting spring, by means of which auxiliary spring a residual prestress can be produced in the supporting spring when the vibration damper is extended, and wherein the auxiliary spring is integrated in the height-adjustment device.

16 Claims, 2 Drawing Sheets

Figure 1:
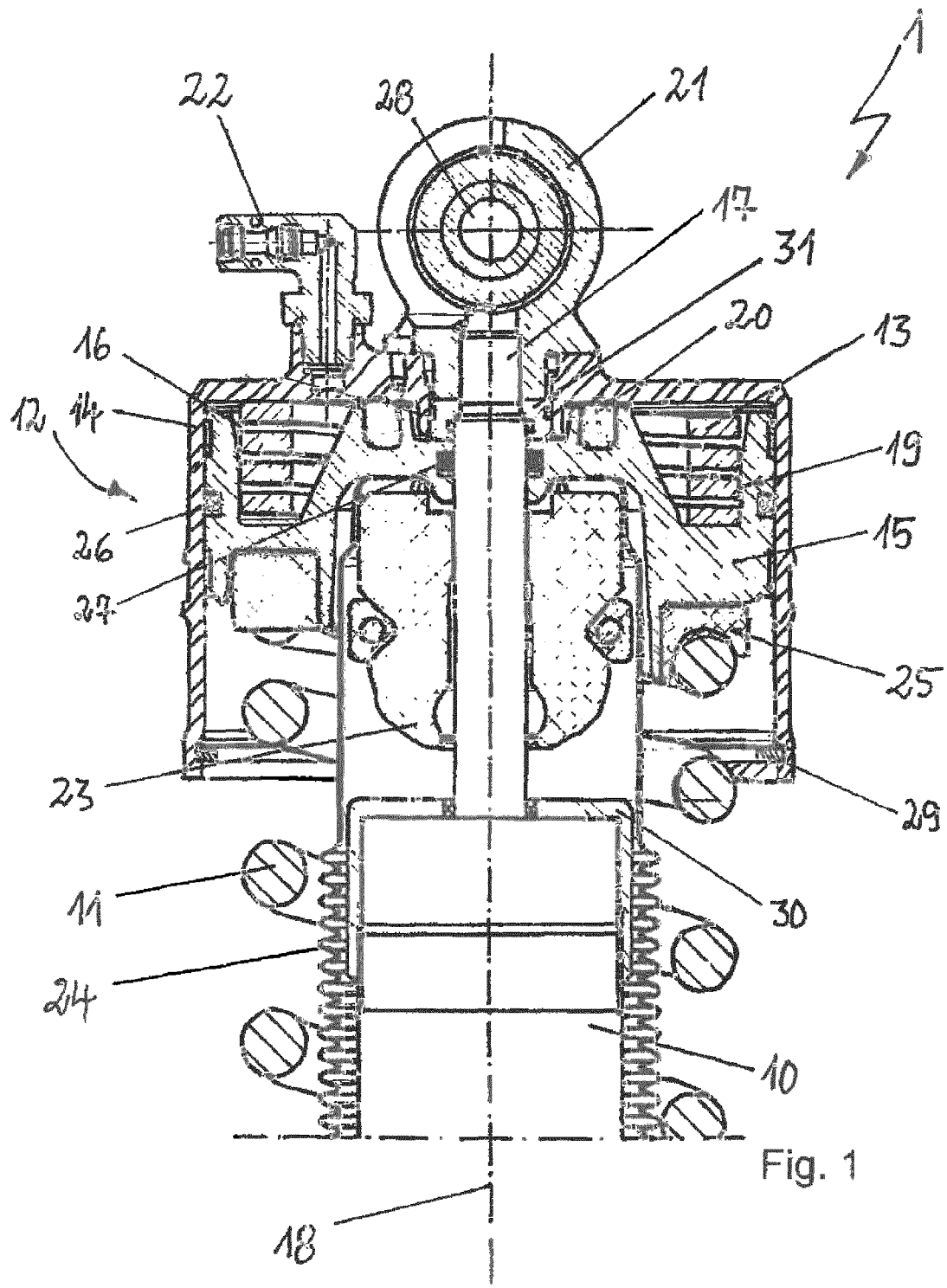

(52) U.S. Cl.
CPC .... *B60G 2202/32* (2013.01); *B60G 2202/413* (2013.01); *B60G 2206/426* (2013.01); *B60G 2500/20* (2013.01); *B60G 2500/30* (2013.01)

(56) References Cited

U.S. PATENT DOCUMENTS

| | | | | |
|---|---|---|---|---|
| 4,473,216 | A * | 9/1984 | Paton | B60G 15/04 267/202 |
| 5,263,695 | A * | 11/1993 | Bianchi | B60G 11/32 267/225 |
| 6,357,543 | B1 * | 3/2002 | Karpik | B60G 3/20 180/182 |
| 7,350,774 | B2 * | 4/2008 | Chun | F16F 1/041 267/169 |
| 8,109,371 | B2 * | 2/2012 | Kondo | B60G 11/15 188/266.3 |
| 8,800,980 | B2 * | 8/2014 | Sawai | B60G 11/14 267/131 |
| 8,827,292 | B2 * | 9/2014 | Batsch | B60G 15/02 267/226 |
| 9,162,548 | B1 * | 10/2015 | Wakeman | B62D 21/00 |
| 2002/0038929 | A1 * | 4/2002 | Now | B60G 15/065 267/217 |
| 2005/0189685 | A1 * | 9/2005 | Verriet | B60G 17/021 267/34 |
| 2008/0217873 | A1 * | 9/2008 | Feuchtner | B60G 17/021 280/5.515 |
| 2009/0302559 | A1 * | 12/2009 | Doerfel | B60G 15/065 280/5.519 |
| 2012/0104704 | A1 | 5/2012 | Nguyen | |
| 2015/0314664 | A1 * | 11/2015 | Mochizuki | F16F 9/38 280/6.157 |
| 2016/0075204 | A1 * | 3/2016 | Marking | F16F 9/062 267/225 |

FOREIGN PATENT DOCUMENTS

| | | | | |
|---|---|---|---|---|
| DE | 19830922 | A1 * | 1/2000 | ......... B60G 15/065 |
| DE | 10336155 | | 3/2005 | |
| DE | 10336155 | B3 * | 3/2005 | ......... B60G 15/065 |
| DE | 102004014336 | | 6/2005 | |
| DE | 102006006871 | | 8/2007 | |
| DE | 102014005602 | A1 * | 10/2014 | ......... B60G 13/08 |
| EP | 1813449 | | 8/2007 | |
| FR | 2840257 | | 12/2003 | |
| FR | 3007478 | A1 * | 12/2014 | ......... B60G 11/14 |
| GB | 2238990 | B | 10/1993 | |
| JP | S58407 | | 1/1983 | |
| JP | S5830811 | | 2/1983 | |
| JP | S60136635 | | 7/1985 | |
| JP | S60136636 | | 7/1985 | |
| JP | S60192138 | | 9/1985 | |
| JP | S60237236 | | 11/1985 | |
| JP | S6118911 | | 2/1986 | |
| JP | H1044738 | | 2/1998 | |
| JP | 2775156 | B2 * | 7/1998 | ......... B60G 17/0272 |

OTHER PUBLICATIONS

Office Action dated Apr. 26, 2016 for EP Application No. 13 794 885.7, 4 pages.
Office Action dated Jul. 6, 2016 for CN Application No. 201380073325.6, 7 pages.

* cited by examiner

SUSPENSION STRUT FOR A MOTOR VEHICLE WITH A HEIGHT-ADJUSTMENT DEVICE

CROSS-REFERENCE TO RELATED APPLICATIONS

This application is a 371 U.S. National Stage of International Application No. PCT/EP2013/074229, filed Nov. 20, 2013, which claims priority to German Application No. DE102012112717.4 filed on Dec. 20, 2012. The disclosure of each of the above applications is incorporated herein by reference in their entirety.

FIELD

The present disclosure relates to a suspension strut for a motor vehicle, having a vibration damper and having a supporting spring.

BACKGROUND

DE 10 2006 006 871 A1 has disclosed a suspension strut for a motor vehicle having a vibration damper and having a supporting spring, and said document presents an auxiliary spring which adjoins the lower end of the supporting spring. The supporting spring is supported against an annular body, and the annular body is supported in a downward direction, toward the wheel carrier, on the auxiliary spring. If the vibration damper fully extends and, in the process, the supporting spring relaxes, the auxiliary spring may, if a residual preload in the supporting spring is undershot, relax such that the annular body against which the upper end of the auxiliary spring is supported can be pressed against the supporting spring. The auxiliary spring thus performs the task of slightly preloading the supporting spring even when the latter is in a fully relaxed state, such that, in particular, rattling noises owing to a supporting spring lifting off from the annular body and/or from the upper spring plate can be prevented. In particular, the auxiliary spring has the effect that the supporting spring, even in the fully relaxed state, reliably bears at one side against the annular body and at the other side against the upper spring plate. In this case, the annular body forms an intermediate disk spring between the supporting spring and the auxiliary spring.

The suspension strut furthermore has two piston-cylinder units which are arranged radially outside the vibration damper and radially within the supporting spring. By means of the units, the preload on the supporting spring can be varied, whereby the spring characteristic of the suspension strut changes, for example for a switchover of the driving characteristic of the vehicle from a comfort setting to a sport setting.

Furthermore, suspension struts having a height adjustment device are known, which are normally constructed from a cylinder element and a piston, wherein, in the cylinder element, there is formed a pressure chamber which can be charged with a pressure medium. In this way, the ride height of the vehicle body can be varied by virtue of the pressure chamber being charged with a pressurized fluid and by virtue of the piston being correspondingly moved in the cylinder element.

Suspension struts which have at least one auxiliary spring and in particular also a height adjustment device exhibit a considerable structural length, which often poses a problem with regard to the installation situation of such suspension struts. The disadvantage of the large structural length of such suspension struts arises in particular from the fact that the auxiliary spring and the supporting spring must be arranged together in series. Furthermore, there is the disadvantage that noise is generated if the auxiliary spring is arranged in an unprotected manner below the supporting spring and is exposed to environmental influences.

SUMMARY

The present disclosure relates to a suspension strut for a motor vehicle, having a vibration damper and having a supporting spring. The suspension strut comprises an auxiliary spring with a lower spring rate than the supporting spring, and by means of the auxiliary spring, a residual preload can be generated in the supporting spring when the vibration damper is in an extended state.

It is an object of the invention to provide a suspension strut for a motor vehicle, having a vibration damper and having a supporting spring and having an auxiliary spring, which suspension strut has a small structural length and is of simple design. In particular, it is sought for the auxiliary spring of the suspension strut to be accommodated so as not to be exposed to environmental influences.

Said object is achieved, taking a suspension strut for a motor vehicle as per the preamble of claim 1 as a starting point, in conjunction with the characterizing features. The dependent claims specify advantageous refinements of the invention.

The invention encompasses the technical teaching that the suspension strut has a height adjustment means, wherein the auxiliary spring is integrated in the height adjustment device.

In this case, the invention is based on the concept of arranging the auxiliary spring within, or at least as a structural unit with, the height adjustment device. In this way, the structural length of the suspension strut is not increased, despite the auxiliary spring being arranged in series with the supporting spring. Owing to the integrated arrangement of the auxiliary spring in the height adjustment device, the auxiliary spring is furthermore not exposed to environmental influences.

The height adjustment device advantageously has a cylinder element, wherein the auxiliary spring is preferably accommodated in the cylinder element. The cylinder element may be of pot-shaped form, and the auxiliary spring may be dimensioned such that it can be accommodated in the cylinder element without the need for said cylinder element to be adapted in terms of its dimensions to the auxiliary spring.

Furthermore, in the cylinder element, there may be accommodated a piston which movably delimits a pressure chamber in the cylinder element, and wherein the auxiliary spring is arranged in the pressure chamber. In this case, the supporting spring is supported at the outside against the piston, and at the inside the auxiliary spring can be braced between the piston and the cylinder element. Consequently, the piston acts as an intermediate disk spring, and in the event of relaxation of the suspension strut and extension of the vibration damper, then it is possible by means of the auxiliary spring for the piston to be acted on with a force directed toward the supporting spring and to be pushed out of the cylinder element as far as a stroke limiting means. At the outside, the supporting spring may be supported against the piston, such that the supporting spring is in a series arrangement with the auxiliary spring. Consequently, even without pressurization of the pressure chamber formed in the cylinder element, a deployment of the piston out of the cylinder element can be effected, whereby the desired residual preload in the supporting spring is maintained.

The vibration damper in the suspension strut has a piston rod which is led through the piston in the longitudinal direction of the suspension strut, and wherein the piston rod is connected to the cylinder element. The piston may be guided within the cylinder element. The piston is advantageously sealed off against the piston rod and in particular also against the inner side of the cylinder element by way of sealing elements. In particular owing to the fact that the piston is guided such that it can perform a stroke movement in the longitudinal direction of the vibration damper, the piston forms an intermediate disk spring, and the auxiliary spring is supported on a first side of the intermediate disk spring, and the supporting spring is supported on an opposite, second side of the intermediate disk spring.

It is also advantageous if the piston has an annular receiving pocket which is formed around its longitudinal direction and in which the auxiliary spring can be at least partially seated. The piston can abut against a stop disk when said piston is retracted into the cylinder element to a maximum extent, wherein the receiving pocket for receiving the auxiliary spring is preferably dimensioned such that, when the stop disk is in abutment against the cylinder element, and in particular against a connecting element of the vibration damper, the spring wire of the auxiliary spring is not compressed into a block state. Owing to the receiving pocket for receiving the auxiliary spring, the structural height of the height adjustment device is not increased, or is not significantly increased, despite the integration of the auxiliary spring. The annularly encircling receiving pocket may be formed between the leadthrough for the piston rod and the outer shell surface of the piston, and in this case, the auxiliary spring presses with its spring force against the base region of the annular receiving pocket. The inner region of the piston may furthermore comprise a stop buffer, which is for example likewise of annularly encircling form and which is composed of an elastic material and which generates an impact-damping action before the piston comes into contact with the stop disk.

When the piston abuts against the stop disk, a volume of the pressure chamber, which is movably delimited by the piston, in the cylinder element is at a minimum. The cylinder element has a pressure medium port via which the pressure chamber can be charged with a pressure medium, for example with compressed air. If a positive pressure is generated in the pressure chamber, the piston is deployed out of the cylinder element, such that the pressure chamber is increased in size. Since the supporting spring is supported at the outside against the piston, the piston rod, which at the end side is rigidly connected by way of a connecting element to the cylinder element, is deployed out of the vibration damper, with the result that the vehicle body of the motor vehicle can be raised.

If the piston is deployed out of the cylinder element over a defined travel by virtue of the pressure chamber being charged with a pressure medium, this likewise results in a lengthening of the auxiliary spring, such that the latter is partially relaxed. Consequently, the deployment of the piston out of the cylinder element is assisted by the auxiliary spring. However, if the supporting spring relaxes and the vibration damper extends, with simultaneous lengthening of the supporting spring, the piston can, even without the pressure chamber being charged with pressure, be deployed out of the cylinder element over the defined travel as far as an extension stop.

The cylinder element and the piston may be of substantially rotationally symmetrical form about the piston rod and thus about the longitudinal direction of the suspension strut. The outer diameter of the cylinder element may in this case be greater than the diameter of the supporting spring, such that the supporting spring can, on the outer side of the piston facing away from the pressure chamber, bear against said piston via a spring receptacle. In particular, the diameter of the receiving pocket for receiving the auxiliary spring at the inside in the piston and the diameter of the spring receptacle for supporting the auxiliary spring at the outside against the piston may be substantially identical.

The auxiliary spring may have a spring wire with a rectangular cross section. This yields the advantage that, for an increased spring rate, the auxiliary spring has a small block dimension. In this way, a situation is likewise avoided in which the height dimension of the height adjustment device on the suspension strut is unnecessarily increased as a result of the integration of the auxiliary spring.

DETAILED DESCRIPTION OF THE FIGURES

Figure 2:
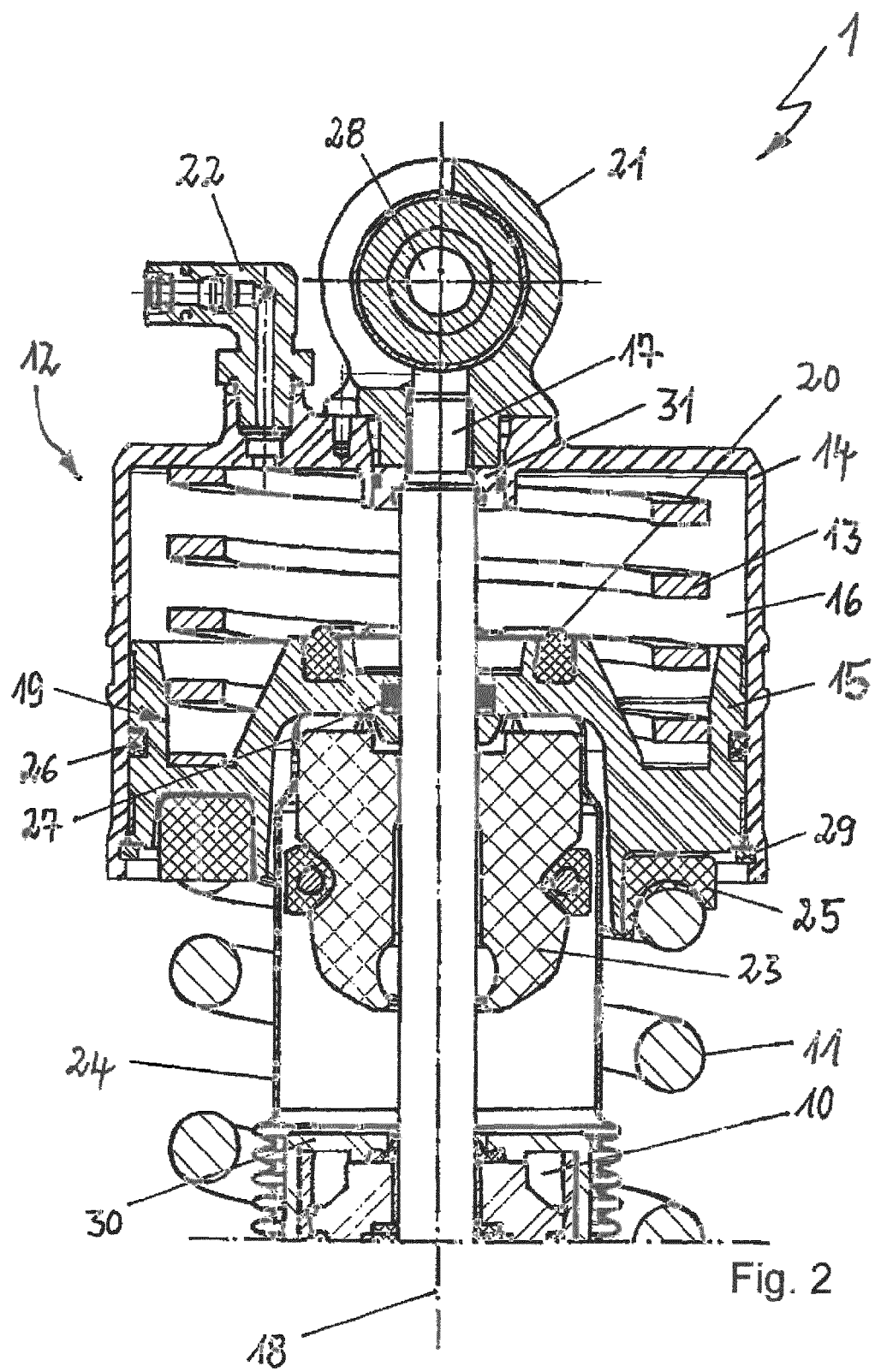

Further measures which improve the invention will be presented in more detail below together with the description of a preferred exemplary embodiment of the invention on the basis of the figures, in which:

FIG. 1 shows an exemplary embodiment of a suspension strut for a motor vehicle having a vibration damper, having a supporting spring and having a height adjustment means, which are in the retracted state, and FIG. 2 shows the exemplary embodiment of the suspension strut for a motor vehicle as per FIG. 1, with the height adjustment device in the extended state.

DETAILED DESCRIPTION

FIGS. 1 and 2 each show a suspension strut 1 for a motor vehicle having a vibration damper 10, having a supporting spring 11 and having a height adjustment device 12, wherein the suspension strut 1 is illustrated in section in the region of the height adjustment device 12. FIG. 1 shows the height adjustment device 12 in a retracted state, and FIG. 2 shows the height adjustment device 12 in an extended state.

The height adjustment device 12 has a cylinder element 14 which is of pot-shaped form and in which a piston 15 is accommodated. The cylinder element 14 is connected, on the top outer side, to a connecting element 21, and the connecting element 21 has a connecting eye 28 by means of which the suspension strut 1 can be articulatedly connected for example to the vehicle body of the motor vehicle. That part of the suspension strut 1 which extends downward in the direction of the wheel carrier is not illustrated in any more detail.

The vibration damper 10 has a piston rod 17 which can be retracted into and deployed out of the vibration damper 10. The free end of the piston rod 17 is connected to the connecting element 21 and consequently forms a rigid unit with said connecting element and with the cylinder element 14.

In the cylinder element 14 there is formed a pressure chamber 16 which is delimited in movable fashion by the piston 15. The pressure chamber 16 can be pressurized, for example with compressed air, via a pressure medium port 22 on the cylinder element 14. In this way, the piston 15 can be deployed downward out of the cylinder element 14 over a defined travel until the piston 15 abuts, at the lower side, against an extension stop 29 which is formed in the region of the open edge of the cylinder element 14. If the pressure chamber 16 is pressurized, and the piston 15 is deployed out of the cylinder element 14 over its defined travel, see FIG. 2, the vehicle body of the vehicle can be raised, because the supporting spring 11 is supported via a spring receptacle 25 against the piston 15 at the outside. If the pressure chamber 16 is ventilated again via the pressure medium port 22, the weight of the vehicle body causes a retraction of the piston 15 into the cylinder element 14 again, whereby the vehicle body of the motor vehicle is lowered again relative to the wheel body. A sealing element 26 is provided for sealing off the piston 15 in the cylinder element 14, and a sealing element 27 is provided for sealing off the piston 15 with respect to the piston rod 17. If the pressure chamber 16 has been fully ventilated, the piston 15 abuts, with prior damping by way of a stop buffer 20, against a stop disk 31 which is in direct contact with the connecting element 21 and which is consequently rigidly connected to the cylinder element 14. A direct force flow from the supporting spring 11 via the spring receptacle 25 and via the piston 15 into the cylinder element 14, or into the connecting element 21, is thus realized.

In the underside of the piston 15 there is received a stop element 23 against which the closure pack 30 of the vibration damper 10 abuts when the piston rod 17 is fully retracted into the vibration damper 10. Also shown is a protective sleeve 24 which surrounds the stop element 23 and the vibration damper 10 and which is retentively received between the stop element 23 and the piston 15.

According to the invention, an auxiliary spring 13 is accommodated in the height adjustment device 12. The auxiliary spring 13 is situated in the pressure chamber 16 of the height adjustment device 12 and is braced between the base of the cylinder element 14 and the piston 15. Consequently, the auxiliary spring 13 exerts on the piston 15 a force in the longitudinal direction 18 of the suspension strut 1, such that the piston 15 can be pushed out of the cylinder element 14 by the auxiliary spring 13 until the piston 15 abuts against the extension stop 29. Since the spring rate of the auxiliary spring 13 is lower than the spring rate of the supporting spring 11, it is the case in the normal state of the motor vehicle that the auxiliary spring 13 is compressed, such that without pressurization of the pressure chamber 16, the piston 15 remains in the retracted position in the cylinder element 14 as shown in FIG. 1. Only when the pressure chamber 16 is pressurized can the piston 15 be deployed out of the cylinder element 14, as shown in FIG. 2. This may be utilized for example for ride-height variation in sports cars in order to at least temporarily increase the ground clearance of the vehicle.

However, if, for example, the motor vehicle lifts off from the roadway or the motor vehicle is situated on a lifting platform or the vibration damper 10 is removed from the motor vehicle, the supporting spring 11 is relieved of load and the piston rod 17 is deployed out of the cylinder of the vibration damper 10. The auxiliary spring 13 serves to maintain a residual preload on the supporting spring 11 when the suspension strut 1 is in the extended state, which auxiliary spring, when the suspension strut 1 is relieved of load, extends and generates a movement of the piston 15 such as can also be generated by a pressurization of the pressure chamber 16.

To realize an integration of the auxiliary spring 13 in the height adjustment device 12 which involves minimal structural space, an annular receiving pocket 19 is formed in the piston 15, in which receiving pocket the auxiliary spring 13 is seated. If the piston 15 abuts, with damping imparted by the stop buffer 20, against the stop disk 31, it is realized, through the corresponding dimensioning of the receiving pocket 19, that the auxiliary spring 13 is not compressed into a block state, and as shown in FIG. 1, the auxiliary spring 13 is shown with the rectangular spring wire cross section, wherein the spring windings do not bear against one another even though the piston 15 has already abutted against the stop disk 31 and is thus situated in the force flow with the cylinder element 14.

As a result, an integration of the auxiliary spring 13 in the suspension strut 1 which involves minimal structural space is realized by virtue of said auxiliary spring being accommodated in the height adjustment device 12. In this case, the piston 15 acts as an intermediate disk spring, and the supporting spring 11 bears against the underside of the piston 15, and the piston is adjoined at the top side by the auxiliary spring 13 at the inside in the receiving pocket 19. The action of the auxiliary spring 13 may in this case be utilized in the same way as with an auxiliary spring 13 arranged in the suspension strut 1 for example at the bottom side of the supporting spring 11 in the direction of the wheel carrier of the vehicle.

The invention is not restricted in terms of its embodiment to the preferred exemplary embodiment specified above. Rather, numerous variants are conceivable which make use of the presented solution even in fundamentally different embodiments. All of the features and/or advantages which emerge from the claims, from the description or from the drawings, including structural details or spatial arrangements, may be essential to the invention both individually and in a wide variety of combinations.

LIST OF REFERENCE NUMERALS

1 Suspension strut
10 Vibration damper
11 Supporting spring
12 Height adjustment device
13 Auxiliary spring
14 Cylinder element
15 Piston
16 Pressure chamber
17 Piston rod
18 Longitudinal direction
19 Receiving pocket
20 Stop buffer
21 Connecting element
22 Pressure medium port
23 Stop element
24 Protective sleeve
25 Spring receptacle
26 Sealing element
27 Sealing element
28 Connecting eye
29 Extension stop
30 Closure pack
31 Stop disk

The invention claimed is:
1. A suspension strut for a motor vehicle having a vehicle body, the suspension strut comprising:
   a vibration damper, having a supporting spring and having a height adjustment device by means of which a height of the vehicle body of the motor vehicle can be varied, the height adjustment device having a cylinder element accommodating a piston which movably delimits a pressure chamber in the cylinder element;

an auxiliary spring disposed in the pressure chamber and having a lower spring rate than the supporting spring, by means of which auxiliary spring a residual preload can be generated in the supporting spring when the vibration damper is in an extended state, and wherein the auxiliary spring is integrated in the height adjustment device; and a stop disk in which the piston abuts against the cylinder element when the piston is retracted to a maximum extent into the cylinder element, wherein the supporting spring is supported on a first side of the piston, and the auxiliary spring is supported on an opposite, second side of the piston.

2. The suspension strut of claim 1 wherein the auxiliary spring is braced between the piston and the cylinder element, such that the piston is acted on by the auxiliary spring with a force directed toward the supporting spring.

3. The suspension strut of claim 1 wherein the vibration damper has a piston rod which is led through the piston in the longitudinal direction of the suspension strut, and wherein the piston rod is connected to the cylinder element.

4. The suspension strut of claim 3 wherein the piston has an annular receiving pocket which is formed around the longitudinal direction and in which the auxiliary spring is at least partially seated.

5. The suspension strut of claim 1 wherein the receiving pocket for receiving the auxiliary spring is dimensioned such that, when the piston is in abutment against the stop disk, a spring wire of the auxiliary spring is not compressed into a block state.

6. The suspension strut of claim 3 wherein the cylinder element and the piston are of substantially rotationally symmetrical form about the piston rod.

7. The suspension strut of claim 6 wherein on an end side of the piston rod, there is arranged a connecting element which is rigidly connected to the cylinder element.

8. The suspension strut of claim 1 wherein the auxiliary spring has a spring wire with a rectangular cross section.

9. The suspension strut of claim 1 further comprising a stop buffer disposed on the piston, the stop buffer configured to impact the cylinder element before the piston comes into contact with the stop disk.

10. The suspension strut of claim 9 wherein the piston second side includes an annular groove configured to receive the stop buffer.

11. The suspension strut of claim 9 further comprising a stop element disposed on the piston first side about the piston rod, the stop element configured to abut against a closure pack of the vibration damper when the piston rod is fully retracted into the vibration damper.

12. The suspension strut of claim 1 wherein the cylinder element includes an open end having an inwardly extending extension stop configured to limit movement of the piston within the cylinder element in a direction toward the supporting spring.

13. The suspension strut of claim 1 wherein the piston first side includes a receiving groove accommodating a spring receptacle to support the supporting spring, and the piston second side includes an annular receiving pocket that receives the auxiliary spring.

14. A suspension strut for a motor vehicle having a vehicle body, the suspension strut comprising:

a vibration damper, having a supporting spring and having a height adjustment device by means of which a height of the vehicle body of the motor vehicle can be varied, the height adjustment device having a cylinder element accommodating a piston which movably delimits a pressure chamber in the cylinder element; and an auxiliary spring disposed in the pressure chamber and having a lower spring rate than the supporting spring, by means of which auxiliary spring a residual preload can be generated in the supporting spring when the vibration damper is in an extended state, and wherein the auxiliary spring is integrated in the height adjustment device, wherein the vibration damper further includes a piston rod which is led through the piston and connected to the cylinder element, a first sealing element sealingly disposed between the piston and cylinder element, and a second sealing element sealingly disposed between the piston and the piston rod, and a stop disk through which the piston abuts against the cylinder element when the piston is retracted to a maximum extent into the cylinder element.

15. A suspension strut for a motor vehicle having a vehicle body, the suspension strut comprising:

a vibration damper having a supporting spring;
a piston rod; and
a height adjustment device configured to vary a height of the vehicle body, the height adjustment device comprising:
  a cylinder element coupled to the piston rod, the piston rod extending through the cylinder element;
  a piston disposed within the cylinder element and having a first side and an opposite second side, the first side abutting and supporting the supporting spring;
  a pressure chamber defined between the piston second side and the cylinder element, the pressure chamber configured to receive a pressurized fluid to selectively vary the height of the vehicle body;
  an auxiliary spring disposed in the pressure chamber and braced between the cylinder element and the piston second side; and
  a sealing element sealing between the piston and the piston rod, and a stop disk through which the piston abuts against the cylinder element when the piston is retracted to a maximum extent into the cylinder element.

16. The suspension strut of claim 15, further comprising:
a stop buffer disposed on the piston and configured to generate an impact-damping action before the piston comes into contact with the stop disk.

* * * * *